United States Patent
Liu et al.

(10) Patent No.: US 7,218,714 B2
(45) Date of Patent: May 15, 2007

(54) METHOD OF CALLING SERVICE AMONG DEVICES IN HOME NETWORK

(75) Inventors: Xiangdong Liu, Beijing (CN); Yujin Luo, Beijing (CN); Yuanyi Zhang, Beijing (CN); Jingnan Huang, Beijing (CN); Weifeng Zhuang, Beijing (CN); Dekui Zhang, Beijing (CN); Yanpin Ren, Beijing (CN); Ming Li, Beijing (CN); Chuang Meng, Beijing (CN); Shan Jiang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 10/539,603

(22) PCT Filed: Jun. 30, 2003

(86) PCT No.: PCT/CN03/00518

§ 371 (c)(1),
(2), (4) Date: Jan. 17, 2006

(87) PCT Pub. No.: WO2004/057800

PCT Pub. Date: Jul. 8, 2004

(65) Prior Publication Data

US 2006/0140373 A1    Jun. 29, 2006

(30) Foreign Application Priority Data

Dec. 20, 2002    (CN) .............................. 02 1 58016

(51) Int. Cl.
*H04M 3/42*        (2006.01)
(52) U.S. Cl. .............................. 379/202.01; 379/210.01
(58) Field of Classification Search ........... 379/202.01, 379/210.01, 211.01, 211.02, 211.03
See application file for complete search history.

(56) References Cited

U.S. PATENT DOCUMENTS 6,418,211 B1 *   7/2002   Irvin .......................... 379/188

FOREIGN PATENT DOCUMENTS

| CN | 1345147 A | 4/2002 |
|---|---|---|
| EP | 1168856 A1 | 1/2002 |
| WO | WO-01/50701 A2 | 5/2000 |

OTHER PUBLICATIONS

International Search Report issued for the Parent PCT application.
* cited by examiner

*Primary Examiner*—Bing Q. Bui
(74) *Attorney, Agent, or Firm*—Dickstein Shapiro LLP (57) ABSTRACT

This invention discloses a method of calling service among devices in home network, comprising following steps: a service calling party obtains a service handle of the called service by using the characterized information of the service, sends a service calling request information to a called party by using the obtained called service handle; the protocol stack of the called party determines whether or not the called service exists based on the service handle of the called service contained in the request information and whether or not the called service has established a renting relationship with the service calling party after receiving the request information, if not, the flow will be ended; if it is, the called party sends service call response message containing service call result to the service calling party; after receiving the service call response message, the protocol stack of the service calling patty determines whether or not the service exist based on the service handle of the called service included in the response message, and whether or not the calling service has established a renting relationship with the called party, if it is, the service calling party and the called party start the actual interacting processing of the service call; otherwise, the flow is ended. This method allows each of devices in the home network to share resources and ensure the reliability of the service call.

9 Claims, 4 Drawing Sheets

METHOD OF CALLING SERVICE AMONG DEVICES IN HOME NETWORK

TECHNICAL FIELD

This invention relates to a technology of calling service in home network. More particularly, the invention provides a method of calling service among devices in home network.

BACKGROUND OF THE INVENTION

As the improvement of the human life, the use of devices such as information devices, communication devices, entertainment devices, home electronic appliances, automating devices, security monitoring devices and the likes in home is increased. Meanwhile, as the personal computers (PCs) and Internet are widely used in home, and with the development of telecommunication technology and smart devices, home network is paid more and more attention. The need for a simple, flexible, and reliable home network enters into human life. Therefore, a lot of home network concepts such as Smart Home, Electronic Home (e-Home), Digital Family, Network Home, Intelligent Home are proposed. More specifically, home network has four meanings: 1) the devices such as information devices, communication devices, entertainment devices, home electronic appliances, automating devices, security monitoring devices and the likes in home are interconnected, share resources, and combine a home smart network system; 2) the devices in home connect to local community network and internet through gateway so that information can be exchanged with the environment out of home; 3) the devices in home and the network to which the devices connect can satisfy the basic requirements of human for security, convenience, comfort, health and environment protection so as to provide the experience to make human enjoyment; and 4) the home network can be easily used, safety and reliable, easily maintained, reasonable price, and satisfy the home life.

Figure 1:
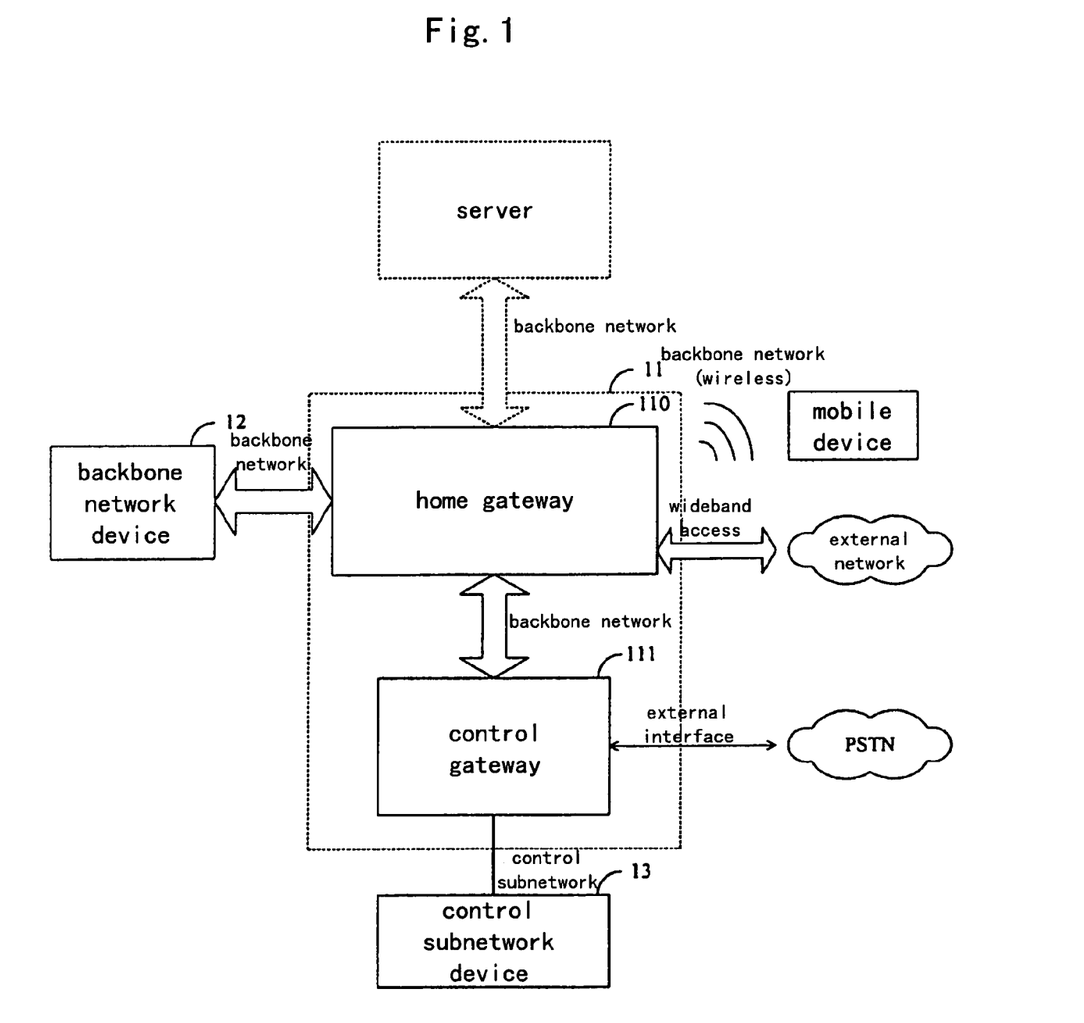
FIG. 1 is a schematic diagram showing the configuration of the home network system according to the invention.

In view of above-mentioned problems, another patent application filed by the applicant of this application proposed a digital home network system. As shown in FIG. 1, the system disclosed in the another patent application comprises a gateway 11, one or more backbone network devices 12 and a plurality of control subnetwork devices 13. The gateway 11 may comprises two sections, a door-gateway 110 and a control gateway 111. The door-gateway 110 connects the control gateway 111 through a wideband interface. According to the configuration of the system, the digital home network comprises two subnetworks, i.e., backbone network and control subnetwork. The network composed of the home gateway 110 and the home devices connected to the home gateway 110 is called as backbone network. The backbone network is used for carrying out the interconnection of the home devices such as information devices, communication devices, entertainment devices and the likes. The network composed of the control gateway 111 and the home devices connected to the control gateway 111 is called as control subnetwork. The control subnetwork is used for carrying out the interconnection of the home devices such as home electronic appliances, automating devices, security monitoring devices and the likes. The digital home network has a function to have the home devices interconnected and to share resource. In the home network system, the home gateway, the control gateway and the server are called as resource management device for managing the network resource.

According to network configuration as described above, the interconnection and the sharing of resource among the network devices are implemented with following manners.

When a device A applies for accessing the home network, first, the device A looks for a resource management device, then sends a registering request to the resource management device. After receiving an authorization from the resource management device, the device A establishes a connection with the resource management device based on the security authorization from the resource management device. The device A registers into the resource management device in the network if the connection is successful. That is, the device A sends its device information to the resource management device and then registers the service which can be provided by the device A itself into the resource management device. The resource management device stores all of device registering information and service registering information so that the information of the devices accessed to the network can be searched easily.

When two devices which have accessed to the home network communicate with each other, the device A which originates the communication first sends a device searching request to the resource management device. The resource management device searches the device registering information into a storing unit in the resource management device to determine whether or not there is an appropriate device to communicate with the device A. If there is an appropriate device B, the information of the device B is sent to the device A. Then, the device A sends a request to device B in response to the reception of the information of device B from the resource management device. The device A calls the service from device B. The device A automatically disconnects with device B after the operation is complete.

The device will perform a logout operation to cancel its relative information, which includes device information and service information, from the resource management device when the device disconnect with the network.

In above operation, the resource management device may exist or not in the network. The devices can perform communication through equity connection formed by self-negotiating among the devices after the mutual searching among the devices is performed. If there is a resource management device in the network, the resource management device would announce the information of itself periodically to other devices. The devices other than the resource management device would also announce their information in various cases.

It can be seen form the operation as described above, various applications based on the home network are implemented by calling services. That is, the service call is a very important step to achieve the interconnection and the sharing of resources in home network.

SUMMARY OF THE INVENTION

It is therefore an object of the present invention to provide a method of calling service among devices in home network, which is capable of sharing the resources among the devices and ensuring the reliability of the service calling.

In order to achieve above object, a method according to the present invention is as follows.

A method of calling service among devices in home network, comprising steps of:

a. a service calling party obtains a service handle of the called service by using the characterized information of the service, sends a service calling request information to a called party by using the obtained service handle;

b. the protocol stack of the called party determines whether or not the called service exists based on the service handle of the called service contained in the request information and whether or not the called service has established a renting relationship with the service calling party after receiving the request information, if it is, the called sends service call response message containing service call result to the service calling party and proceeds into step c; otherwise, the flow is ended;

c. after receiving the service call response message, the protocol stack of the service calling party determines whether or not the service exist in the calling party based on the service handle of the calling service included in the response message, and whether or not the calling service has established a renting relationship with the called party, if it is, the service calling party and the called party start the actual interacting processing of the service call; otherwise, the flow is ended.

The method further comprises the step of after the protocol stack of the service calling party and the protocol stack of the service called party determine that the service calling party has established renting relationship with the service called party, the service called party determines whether or not the number which the service is called currently exceeds a parallel-sending control threshold of the called service, if it is, the called party sets a denying-call to the service call result; otherwise, the called party sets an allowing-call to the service call result.

The method further comprises the step of obtaining a service handle for uniquely identifying the service after the service registration of the each of the services is successful.

According to the method as described above, the step a of obtaining the service handle further comprising:

a1. the service calling party searches whether or not the called service exist in local protocol stack by using the characteristic description of the called service, if it is, the service handle of the called service is returned, and end the searching process; if not, step a2 will be executed;

a2. the service calling party search whether or not the called service exist in other home network devices by using the characteristic description of the called service, if it is, the service handle of the called service is returned, and set the party which can provide the called service as the called party; otherwise, the flow will be ended.

Preferably, the actual interacting process of the service call in said step c comprises at least a basic service call process, each of the basic service call processes comprises steps of:

c1. the service calling party sends service call request message to the service called party through the protocol stack of the service calling party and the protocol stack of the service called party sequentially;

c2. after receiving the request message, the called party returns a service call response message containing the information required by the calling party to the calling party through the protocol stack of the service called party and the protocol stack of the service calling party sequentially.

Preferably, the protocol stack of the service calling party stack and the protocol stack of the service called party process the service call request message and the service call response message by using a service call request call-back function and a service call response call-back function which are provided by called service and calling service respectively.

The service call request call-back function and the service call response call-back function are transferred to the local protocol stack by a application corresponding to the current registered service when the service is registered.

Therefore, according to the method of calling service among devices in home network provided by the present invention, it can checks whether or not the called service is currentingly available, is registered, establishes renting relationship, or conform to the parallel-sending control before each of services is normally called since the service call is associated with service registration, service searching and service renting. Thus, the method according to the present invention can ensure the security, reliability and cooperativity of the service call operation.

DETAILED DESCRIPTION OF THE PREFERRED EMBODIMENTS

The present invention will be described referring to the accompanying drawings.

Figure 2:
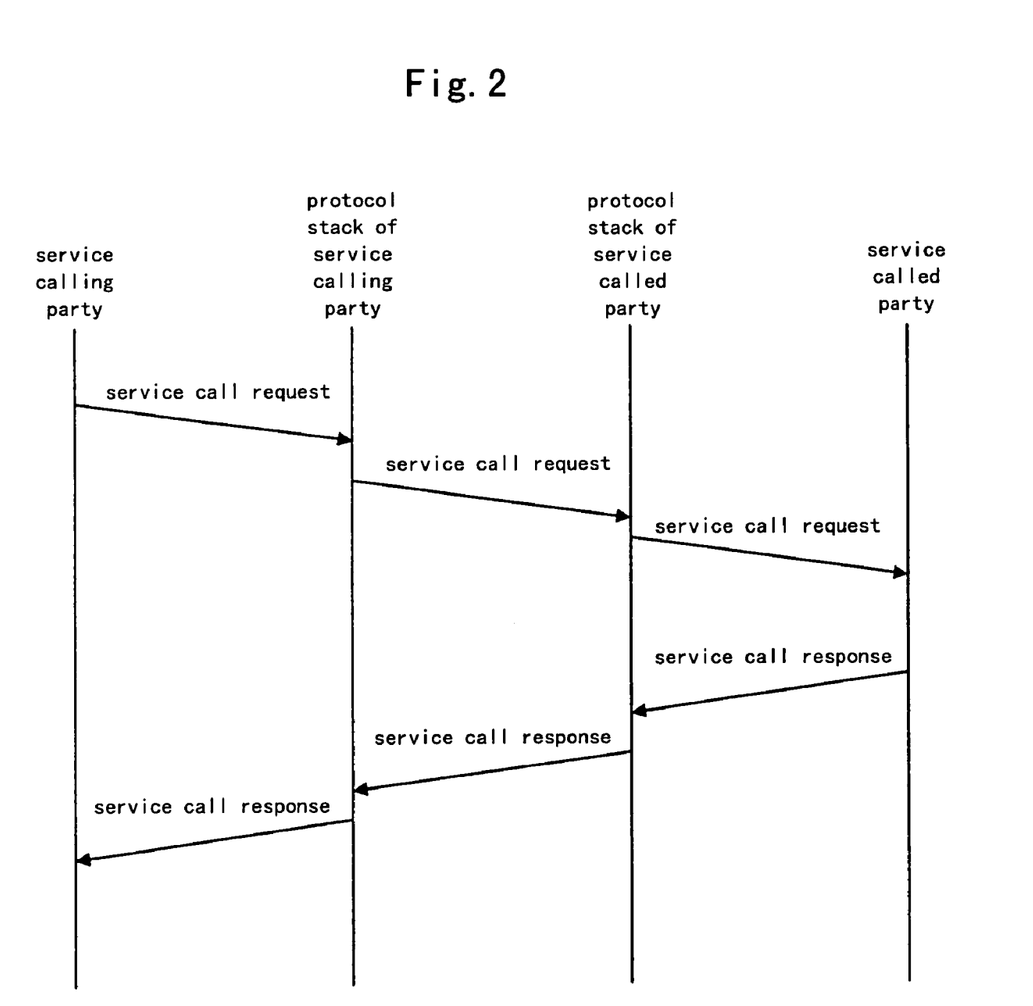
FIG. 2 is a flowing chart showing a simple example for implementing the service call process.

As shown in FIG. 2, a simple service call process will be described below by way of example. A service calling party sends a service call request message to a service called party. The request message is transferred to the service called party through the protocol stack of the calling party and the protocol stack of the called party. After receiving the request message, the called party returns a service call response message containing the information desired by the calling party to the calling party through the protocol stack of the called party and the protocol stack of the calling party. In practical, the process shown in FIG. 2 is only one interactive process between the calling party and the called party for the service call operation (hereinafter referred as to a basic service call process). Generally, it is necessary to perform a plurality of basic service call processes between the calling party and the called party for a complete service call process.

Further, in the home network, the service call should be associated with the operations such as service registration, service searching, service authorization, service renting and the like so as to adapt the dynamic change of the services and satisfy the requirements for security. The combination of the service registration and the service searching may adapt the dynamic change of the service, and the combination of the service authorization and service renting may satisfy the requirements for security. Therefore, the service call in home network should satisfy following conditions:

1) Each of applications should perform service registration in advance if it wish to run as a service. The information such as name and type of the service is informed to the protocol stack at the local end, and it is possible to collectively manage the service and service searching. The protocol stack at the local end returns a service handle to the application after the service registration is successful. The service handle may uniquely identify the service and will be used for service searching, service authorization, service renting and service call in later process.

The application also transfers other information to the protocol stack at the local end during the service registration. Following two items of content included in the information relate to service call:

a. a service call request call-back function which the protocol stack of the calling party service calls this function to perform the actual service call operation after the protocol stack of the calling party receives the service call request sent to the called service.

b. a service call response call-back function which the protocol stack of the called party which responds for feeding the result for service call to the protocol stack of the calling party calls this function to inform the service calling party of the performing result after the protocol stack of the calling party receives the fed information.

2) The service calling party may indicate the information such as name or type of the service to be searched in the searching request to determine the object to be searched so that the service searching is performed. The protocol stack of the service calling party searches the desired service in the registered services based on the indicated information, and the service handle of the searched service is transferred to the service calling party if the corresponding service is found. It is only necessary for the service calling party to indicate the service handle of the called service in the service call, the concrete transferring process is performed by the protocol stack.

3) In view of security transmission, each of the services has respective security attributes. The services can be classified into public service and private service according to their security attributes. The public service means a type of service which anyone can call it. The private service means a type of service which can only be called after receiving the authorization from the owner of the service.

4) In order to guarantee the quality of service, the number of times for which a same service is simultaneously called should be limited. A parallel-sending control exists in the home network. That is, the number of times for which a same service is simultaneously called is controlled. The control operation is performed by service renting. Therefore, it is necessary for the service calling party to rent the service before the service is called. The service call is performed only after the service renting is successful. The detail process is as follows: the service calling party sends service renting request to the called service; after receiving the request, the called service determines whether or not to lease the service based on the maximal allowable parallel-sending number of times itself and the currently using status of the called service; denying the renting of the service if the using number of times of the service has reached the maximal allowable parallel-sending number of times which is supported by the service; otherwise, allowing the renting of the service so that the parallel-sending control can be implemented in the home network.

Figure 4:
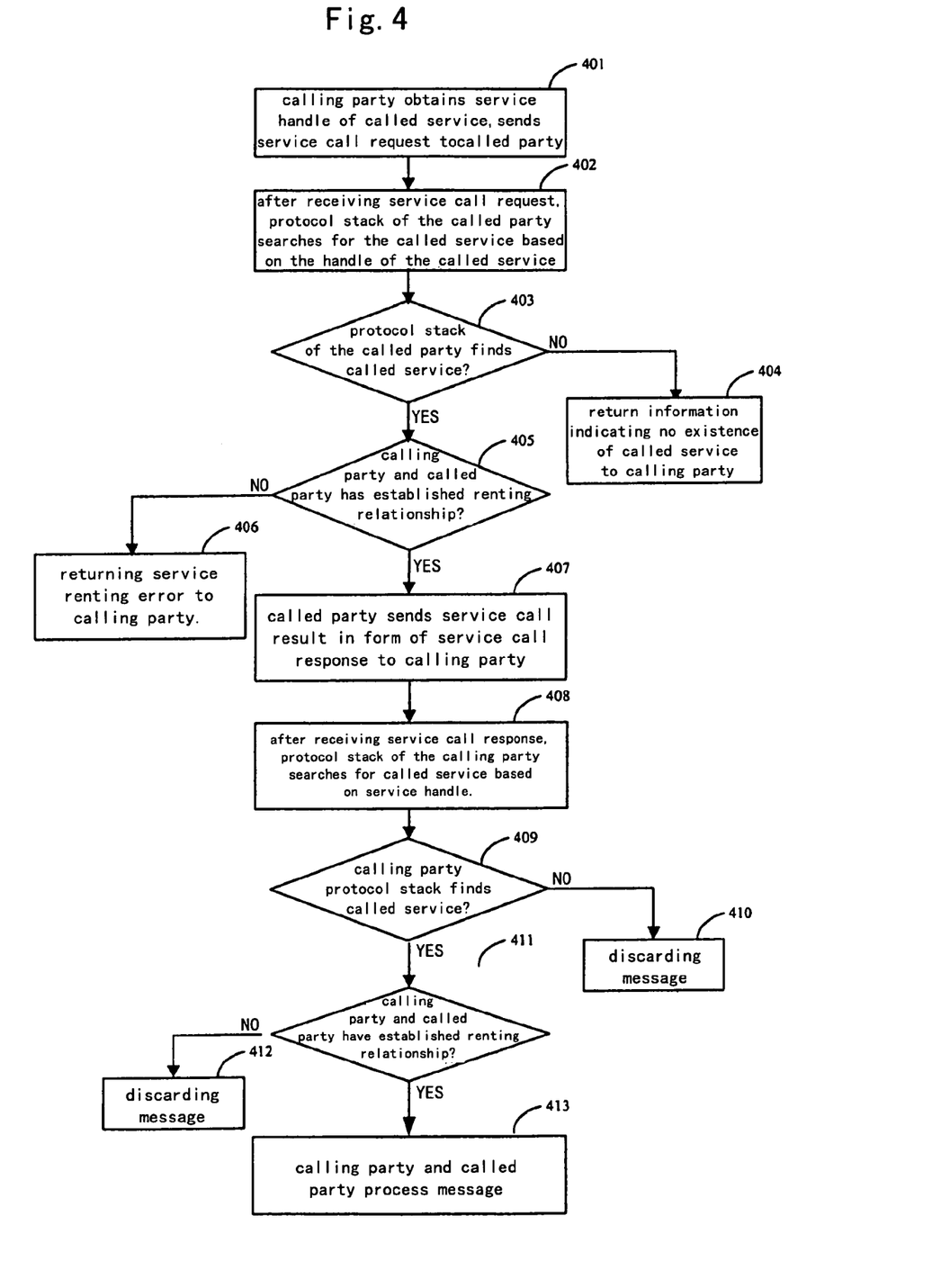
FIG. 4 is a flowing chart showing the service call process according to the invention.

Based on various conditions as described above, FIG. 4 shows the flow chart for implementing the concrete service call process, comprising following steps:

Step 401: when a service is called, first, the service calling party searches the service handle corresponding to the called service, sends a service call request to the called party after finding the service handle.

The service calling party also transfers the buffer area address and data length containing concrete calling information to the local protocol stack while the service call request is sent. The protocol stack of the service calling party transfers the call information to the protocol stack of the called party based on the service handle of the called party.

Figure 3:
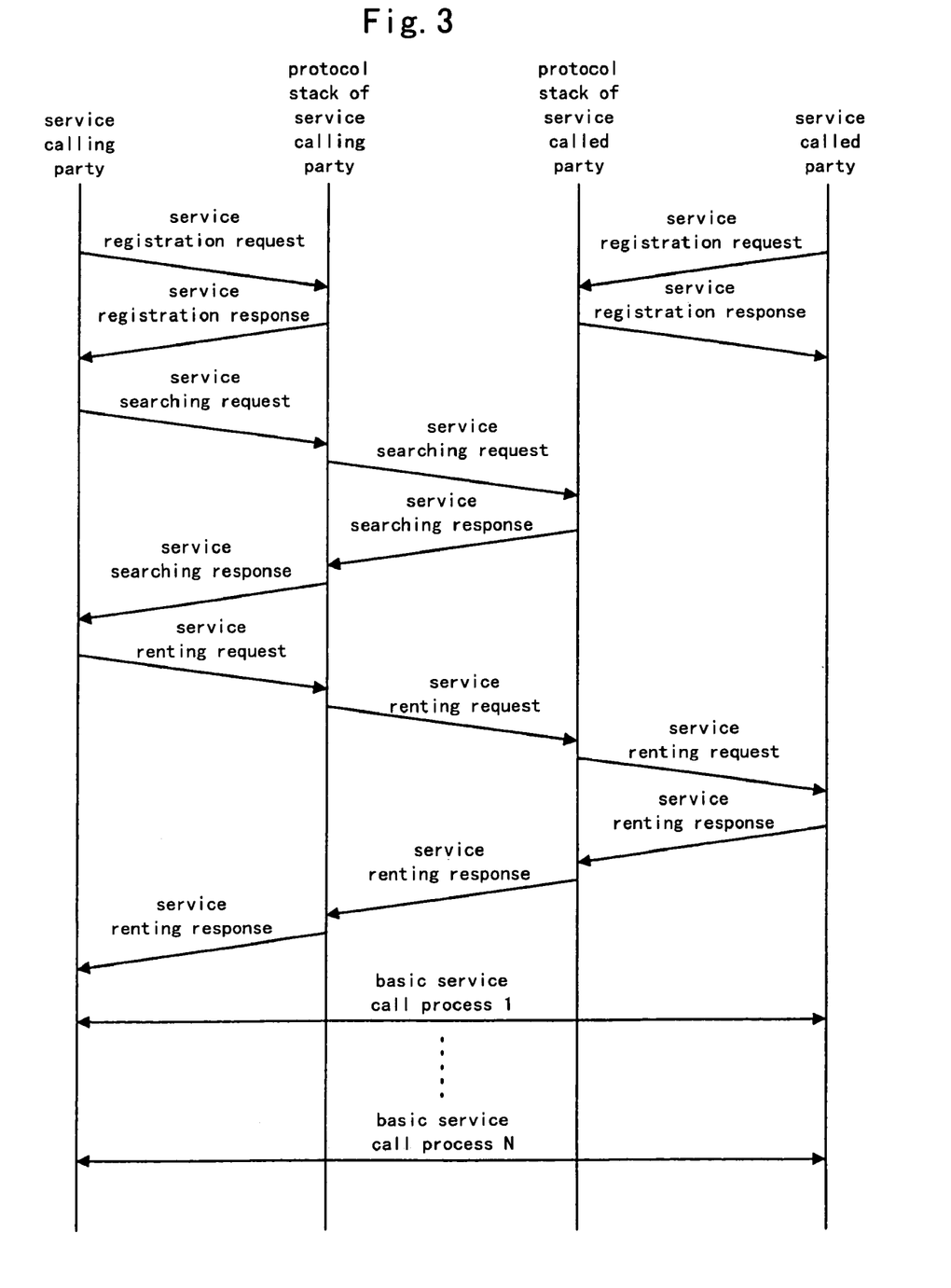
FIG. 3 is a timing chart showing the signaling for implementing the service call process according to the invention.

Each of the services will register its service into the device to which the service belongs and the resource management device in the home network when the device accesses into the home network, as shown in FIG. 3. After the registration is successful, each of the services will have its own service handle. The service registration response contains the service handle of service which is registered currently. Therefore, the service handle of the service calling party and the service handle of the service called party should be indicated in the service call process so that the service handle is used to complete the interaction of the messages.

For example, the service handles of calling service and called service is searched with following method: if service A calls service B and service A is then the service calling party and service B is the service called party. Service A do not know the existence of the service B, it only knows the characteristics to be searched. Therefore, the service calling party searches whether or not the service B exists in the protocol stack of the calling party by using the description of service characteristics. If it exists, the service handle of the service B is returned. After that, the service handle of the service A continuously communicates with the service handle of the service B. Otherwise, the service calling party searches whether or not the service B exists in other devices in the home network by using the description of service characteristics. If it exists, the service handle of the service B is returned, and it determines the party to which the service B belongs is the called party. If the service B does not exist in all devices in the home network, the searching flow is ended.

Steps 402–404: after receiving the service call request, the protocol stack of the called party searches whether or not corresponding service exists in the registered services based on the service handle of the called service included in the service call request. If it does not exist, an error indication code B_E_SERVICE_NOT_EXIST indicating the inexistence of the service is returned to the service calling party. The service calling party ends the calling flow after receiving the error indication code. Otherwise, the flow proceeds into step 405.

Steps 405–406: the protocol stack of the called party judges whether or not the currently called service has established a renting relationship with service calling party. If not, the service called party returns an error indication code B_E_SERVICE_RENT_DENIED indicating a service renting error to the service calling party. The service calling party ends the calling flow after receiving this error indication code. Otherwise, the flow proceeds into step 407.

Step 407: the called party sends the service call result in the form of service call response to the service calling party, i.e., returning a indication to allow the service calling party to call the service. After obtaining the service call response, the protocol stack of the service called party sends the response to the protocol stack of the service calling party protocol stack.

Steps 408–412: after receiving the service call response, the protocol stack of the service calling party protocol stack checks the service search and the renting relationship based on the service handle to determine whether or not any one of steps of the both is error. That is, in the case where currently called service is not found, or renting relationship between the called party and the calling party is not established, the response message will be discarded, no process will be carried out. Otherwise, the flow will proceed into step 413.

Step 413: if the checking results for the service search and the renting relationship by the service calling party indicate that the service handle has been found and the renting relationship has been established, the service calling party and the service called party will start the actual service call process. In the sequent service call process, the protocol stack of the service calling party and the protocol stack of the service called party process the call request and the response information by using the service call and call-back function provided by the calling service and called service respectively. The service call and call-back function includes a service call request call-back function and a service call response call-back function. The service call and call-back function is transferred to the respective protocol stacks by the applications corresponding to the registered service when the service is registered.

At least one basic service call process is interacted between the service calling party and the service called party until the service call which is completed once ends.

In the steps as described above, the method may comprises the step of performing parallel-sending control after the service calling party or the service called party has confirmed that the renting relationship between the service calling party and the service called party has established. That is, it judges whether or not the number of times currently calling the called service exceeds the parallel-send control threshold of the called service. If it is, the called party set the service call result as call denial. Otherwise, the called party set the service call result as call allowance.

It can be seen from the description for the basic service call process that the use of the services by unauthorized users can be avoided and the security of the service call can be guaranteed because the renting relationship is checked during the service call process.

The formats of service call request message and the service call response message, which are used in above steps, are shown in following table 1 and table 2, respectively. Table 1 shows the detail format of the service call request message, including name of field, content of field, type of field and the range of value of the field.

TABLE 1

| Name of field | Content | Type | Range of Value |
| --- | --- | --- | --- |
| Message type | Type of message | Character string | Fixed to: ServiceUsingRequest |
| Message sequence No. | Sequence No. of message | Signless integers | 0 to 0xFFFFFFFF |
| Target device ID | Device ID of called party | Character string | Character string with 32 bytes in length |
| Target function ID | Service ID of called party | Character string | Character string with 8 bytes in length |
| Source device ID | Device ID of calling party | Character string | Character string with 32 bytes in length |
| Source service ID | Service ID of calling party | Character string | Character string with 8 bytes in length |
| Action name | Indicating name of detail action of called service, it can be omitted if not necessary | Character string | Character string with 256 bytes in maximal length |
| Parameter name | Name of parameters corresponding to the actions, may include a plurality of names. The name of parameters may not be provided if no name of actions is indicated. | Character string | Character string with 256 bytes in maximal length |
| Parameter value | Parameter value, appearing as a pair with the name of parameter | Character string | Character string with 256 bytes in maximal length |
| Binary data length | Length of binary data contained in calling request message | integers | 0 to 0x7FFFFFFF |
| Binary data content | Content of binary data contained in calling request message | binary | Arbitrary value |

Table 2 shows the detail format of the service call response message, including name of field, content of field, type of field and the range of value of the field.

TABLE 2

| Name of field | Content | Type | Range of Value |
| --- | --- | --- | --- |
| Message type | Type of message | Character string | Fixed to: ServiceUsingResponse |
| Message sequence No. | Sequence No. of message | Signless integers | 0 to 0xFFFFFFFF |

TABLE 2-continued

| Name of field | Content | Type | Range of Value |
|---|---|---|---|
| Target device ID | Device ID of calling party | Character string | Character string with 32 bytes in length |
| Target function ID | Service ID of calling party | Character string | Character string with 8 bytes in length |
| Source device ID | Device ID of called party | Character string | Character string with 32 bytes in length |
| Source service ID | Service ID of called party | Character string | Character string with 8 bytes in length |
| Action name | Indicating name of detail action of calling party service, it can be omitted if not necessary | Character string | Character string with 256 bytes in maximal length |
| Parameter name | Name of parameters corresponding to the actions, may include a plurality of names. The name of parameters may not be provided if no name of actions is indicated. | Character string | Character string with 256 bytes in maximal length |
| Parameter value | Parameter value, appearing as a pair with the name of parameter | Character string | Character string with 256 bytes in maximal length |
| Binary data length | Length of binary data contained in calling request message | integers | 0 to 0x7FFFFFFF |
| Binary data content | Content of binary data contained in calling request message | binary | Arbitrary value |

It can be seen from table 1 and table 2, the first six fields included in each of the messages are same. That is, the first field is message type, the second field is message sequence number used for retransmission of the message and correspondence of response message and request message. The third to sixth fields indicate the service calling party and the service called party.

In practice, the service call request message and the service call response message may be implemented by using XML language. According to the present invention, the actual called data, for example, the description and the likes for the content or function of the service to be called, sent by the applications can be transmitted with the manner of Hypertext transfer Protocol (HTTP) plus simple object access protocol (SOAP). For data with simple format, i.e., general data which is necessary to be filled when any service is called, for example, basic information of the called service, it may transfer the calling information by indicating the called name of the action, parameter name corresponding to the action and parameter value. The data with other formats are transmitted as general binary data. The concrete meanings of the data are analyzed by the service calling party and the service called party. The protocol stack only responds for transmission.

Although the present invention has been described by way of exemplary embodiments, it should be understood that many changes and modifications may further be made by those skilled in the art without departing from the scope of the present invention which is defined by the appended claims.

What is claimed is:

1. A method of calling service among devices in a home network, the method comprising:

a service calling party obtaining a service handle of a called service by using characteristic information of the called service and sending a service call request message to a called party using the service handle obtained;

a protocol stack of the called party, after receiving the service call request message, determining whether or not the called service exists at the called party based on the service handle of the called service contained in the service call request message and determining whether or not the called service has established a renting relationship with the service calling party, wherein if a renting relationship is established, the called party sends a service call response message containing a service call result to the service calling party; otherwise, the process is ended; and a protocol stack of the service calling party, after receiving the service call response message, determining whether or not a calling service exists in the calling party based on a service handle of the calling service contained in the service call response message and determining whether or not the calling service has established a renting relationship with the called party, wherein if a renting relationship is established between the calling service and the calling party, the service calling party and the called party begin art interacting process of a service call; otherwise, the process is ended.

2. The method according to claim 1, wherein each of the service handle is provided after service registration of a corresponding service is completed and uniquely identifies the corresponding service.

3. The method according to claim 1, wherein, when the service calling party obtains the service handle of the called service, the service calling party searches for whether or not the called service exists in the protocol stack of the calling party using the characteristic information of the called service;
- if the called service exists in the protocol stack of the calling party, the service handle of the called service is returned, and the search is ended; or
- if the called service does not exist in the protocol stack of the calling party, the service calling party searches for whether or not the called service exists in other home network devices using the characteristic information of the called service, wherein if the called service exists in at least one of the other home network devices, the service handle of the called service is returned, and the one of the other home network devices is set as the called party; otherwise, the process is ended.

4. The method according to claim 1, wherein:
- the service calling party sends service call request message to the called party through the protocol stack of the service calling party and the protocol stack of the called party sequentially; and
- after receiving the service call request message, the called party returns the service call response message containing the characteristic information of the called service required by the service calling party to the service calling party through the protocol stack of the called party and the protocol stack of the service calling party sequentially.

5. The method according to claim 4, wherein the protocol stack of the service calling party and the protocol stack of the service called party process the service call request message and the service call response message by using a service call request call-back function and a service call response call-back function, which are provided by the called service and the calling service respectively.

6. The method according to claim 5, wherein, at the time of service registration, the service call request call-back function and the service call response call-back function are transferred respectively to the protocol stacks, by an application corresponding to the service registration.

7. The method according to claim 1, further comprising:
- after the service calling party or the called party determines that the service calling party has established a renting relationship with the called party, determining whether or not the number of which the service is called currently exceeds a parallel-sending control threshold of the called service,
- wherein the called party sets the service call result as denying-call, if the parallel-sending control threshold is exceeded; or the called party sets the service call result as allowing-call, if the parallel-sending control threshold is not exceeded.

8. A method of making a service call among a plurality of devices in a home network, the method comprising:
- obtaining a service handle of a called service using characteristic information of the called service;
- sending a service call request message to a called party, the service call request message containing the service handle;
- determining whether or not the called service exists at the called party based on the service handle;
- determining whether or not the called service has established a renting relationship with a service calling party, wherein if a renting relationship is established, a service call response message containing a service call result is sent to the service calling party; otherwise, the process is ended; and
- determining whether or not a calling service exists in the calling party based on a service handle of the calling service contained in the service call response message; and
- determining whether or not the calling service has established a renting relationship with the called party, wherein if a renting relationship is established between the calling service and the calling party, the service calling party and the called party begin an interacting process of the service call; otherwise, the process is ended.

9. A method of making a service call among a plurality of devices in a home network, the method comprising:
- sending a service call request message to a service called party through a protocol stack of a service calling party and a protocol stack of the called party; and
- in response to the service call request message, returning a service call response message to the service calling party through the protocol stack of the called party and the protocol stack of the service calling party;
- wherein the service call request message contains a service handle identifying a called service, and wherein the service call response message contains a service handle identifying a calling service.

* * * * *